(12) United States Patent
Chow et al.

(10) Patent No.: US 6,990,101 B1
(45) Date of Patent: Jan. 24, 2006

(54) SYSTEM AND METHOD FOR PERFORMING LAYER 3 SWITCHING IN A NETWORK DEVICE

(75) Inventors: Peter Ka-Fai Chow, San Jose, CA (US); Shr-Jie Tzeng, Fremont, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 839 days.

(21) Appl. No.: 09/814,813

(22) Filed: Mar. 23, 2001

(51) Int. Cl.
*H04L 12/28* (2006.01)
*H04L 12/56* (2006.01)

(52) U.S. Cl. ..................... 370/392; 370/389
(58) Field of Classification Search ............... 370/389, 370/392, 401, 409, 395.3, 395.1, 290, 252, 370/396–399, 395.5, 395.52, 395.7, 395.71, 370/395.72, 400, 470–476, 497, 469, 912, 370/902, 368, 371, 374, 378, 379, 381–383; 709/245, 250, 230, 201, 212, 223–226, 238–224, 709/227–229, 200, 225
See application file for complete search history.

(56) References Cited

U.S. PATENT DOCUMENTS

| | | | | |
|---|---|---|---|---|
| 5,909,686 A | * | 6/1999 | Muller et al. ............ 707/104.1 |
| 5,938,736 A | * | 8/1999 | Muller et al. ............... 709/243 |
| 6,006,272 A | * | 12/1999 | Aravamudan et al. ...... 709/245 |
| 6,016,310 A | * | 1/2000 | Muller et al. ............... 370/255 |
| 6,023,563 A | * | 2/2000 | Shani ......................... 709/249 |
| 6,076,115 A | * | 6/2000 | Sambamurthy et al. ..... 709/250 |
| 6,085,248 A | * | 7/2000 | Sambamurthy et al. ..... 709/229 |
| 6,098,103 A | * | 8/2000 | Dreyer et al. ............... 709/234 |
| 6,128,666 A | * | 10/2000 | Muller et al. ............... 709/238 |
| 6,216,167 B1 | * | 4/2001 | Momirov ..................... 709/238 |
| 6,246,680 B1 | * | 6/2001 | Muller et al. ............... 370/389 |
| 6,301,674 B1 | * | 10/2001 | Saito et al. .................. 713/340 |
| 6,330,584 B1 | * | 12/2001 | Joffe et al. .................. 718/107 |
| 6,347,087 B1 | * | 2/2002 | Ganesh et al. .............. 370/392 |
| 6,473,411 B1 | * | 10/2002 | Kumaki et al. ............. 370/331 |
| 6,484,209 B1 | * | 11/2002 | Momirov ..................... 709/238 |
| 6,512,774 B1 | * | 1/2003 | Vepa et al. .................. 370/401 |
| 6,574,240 B1 | * | 6/2003 | Tzeng ......................... 370/469 |
| 6,577,630 B1 | * | 6/2003 | Markwalter et al. ........ 370/392 |
| 6,601,101 B1 | * | 7/2003 | Lee et al. .................... 709/227 |
| 6,771,673 B1 | * | 8/2004 | Baum et al. ................. 370/535 |
| 6,772,226 B1 | * | 8/2004 | Bommareddy et al. ..... 709/245 |
| 6,779,039 B1 | * | 8/2004 | Bommareddy et al. ..... 709/238 |
| 6,826,613 B1 | * | 11/2004 | Wang et al. ................. 709/227 |
| 6,850,495 B1 | * | 2/2005 | Baum et al. ................. 370/256 |
| 2002/0010793 A1 | * | 1/2002 | Noll et al. .................... 709/240 |

* cited by examiner

*Primary Examiner*—Wellington Chin
*Assistant Examiner*—Jamal A. Fox
(74) *Attorney, Agent, or Firm*—Harrity & Snyder LLP

(57) ABSTRACT

A network device includes a receive module, a port filter, an action generator, processing logic, and a transmit module. The receive module receives a packet and detects whether the packet includes a router media access control (MAC) destination address. The port filter stores Internet Protocol (IP) source and destination addresses, determines whether an IP destination address associated with the packet has been stored, and identifies policy handling information for the packet. The action generator generates, based on the policy handling information, forwarding information for the packet. The forwarding information includes at least a port vector, and, when the IP destination address associated with the packet has been stored, a replacement MAC destination address. The processing logic determines a replacement MAC destination address when the IP destination address associated with the packet has not been stored. The transmit module transmits the packet based on the replacement MAC destination address.

18 Claims, 8 Drawing Sheets

SYSTEM AND METHOD FOR PERFORMING LAYER 3 SWITCHING IN A NETWORK DEVICE

TECHNICAL FIELD

The present invention relates generally to communication systems and, more particularly, to a system and method for performing layer 3 switching in a network device.

BACKGROUND ART

At the heart of most networks are switches interconnected via a communications medium. For example, Ethernet is a commonly used local area network scheme in which multiple stations are connected to a single shared or dedicated serial data path. These stations communicate with a switch located between the data path and the stations connected to that path. The switch controls the communication of data packets on the network.

Networks are frequently organized into sub-networks, called subnets. Within a single subnet, packets of information may be directed to their destinations using a layer 2 Media Access Control (MAC) address that identifies the attached Ethernet devices. When a switch receives a packet with a familiar destination MAC address, it forwards the packet to the output port on the switch that is associated with the MAC address.

Packets transmitted between layer 2 subnets are forwarded using the destination device's Internet Protocol (IP) layer 3 address. More particularly, a transmitting device sending a packet to a destination device outside of the transmitting device's subnet first determines, using the IP layer 3 address, the layer 2 MAC address of a gateway router that bridges the subnets. The gateway router, upon receiving the packet, performs address translation, which involves stripping the MAC destination address of the router and inserting a new MAC destination address that corresponds to the MAC address of the destination device in the destination subnet. The router determines the MAC address to insert based on the IP address of the destination device.

Network switches may also be used to transmit packets between layer 2 subnets. In these situations, the layer 3 switching operation is commonly performed through the use of a layer 3 internal rules checker (IRC). The layer 3 IRC determines, via an address lookup table, the MAC destination address that corresponds to the MAC address of the destination device in the destination subnet. Not all network switches, however, include a layer 3 IRC. As such, those switches may not be capable of performing layer 3 switching.

DISCLOSURE OF THE INVENTION

There exists a need for a mechanism that improves layer 3 switching in a network device. This and other needs are met by the present invention, where local hardware, under software control when needed, allows for layer 3 switching to be performed in a network device that lacks a layer 3 IRC.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that includes a receive module, a port filter, an action generator, processing logic, and a transmit module. The receive module receives a packet and detects whether the packet includes a router MAC destination address. The port filter stores IP source and destination addresses, determines whether an IP destination address associated with the packet has been stored, and identifies policy handling information for the packet. The action generator generates, based on the policy handling information, forwarding information for the packet. The forwarding information includes at least a port vector, and, when the IP destination address associated with the packet has been stored, a replacement MAC destination address. The processing logic determines a replacement MAC destination address when the IP destination address associated with the packet has not been stored. The transmit module transmits the packet based on the replacement MAC destination address.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
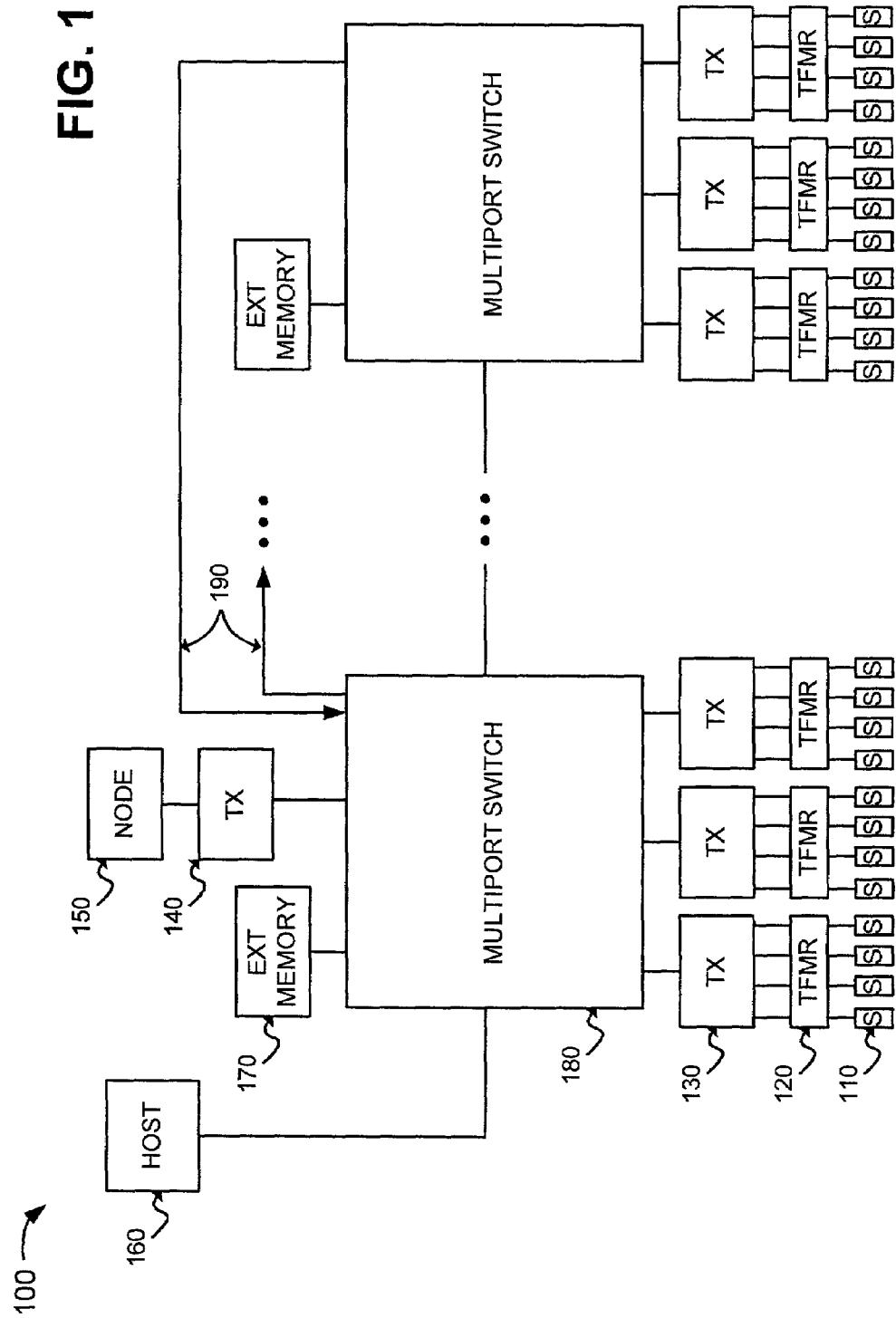
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
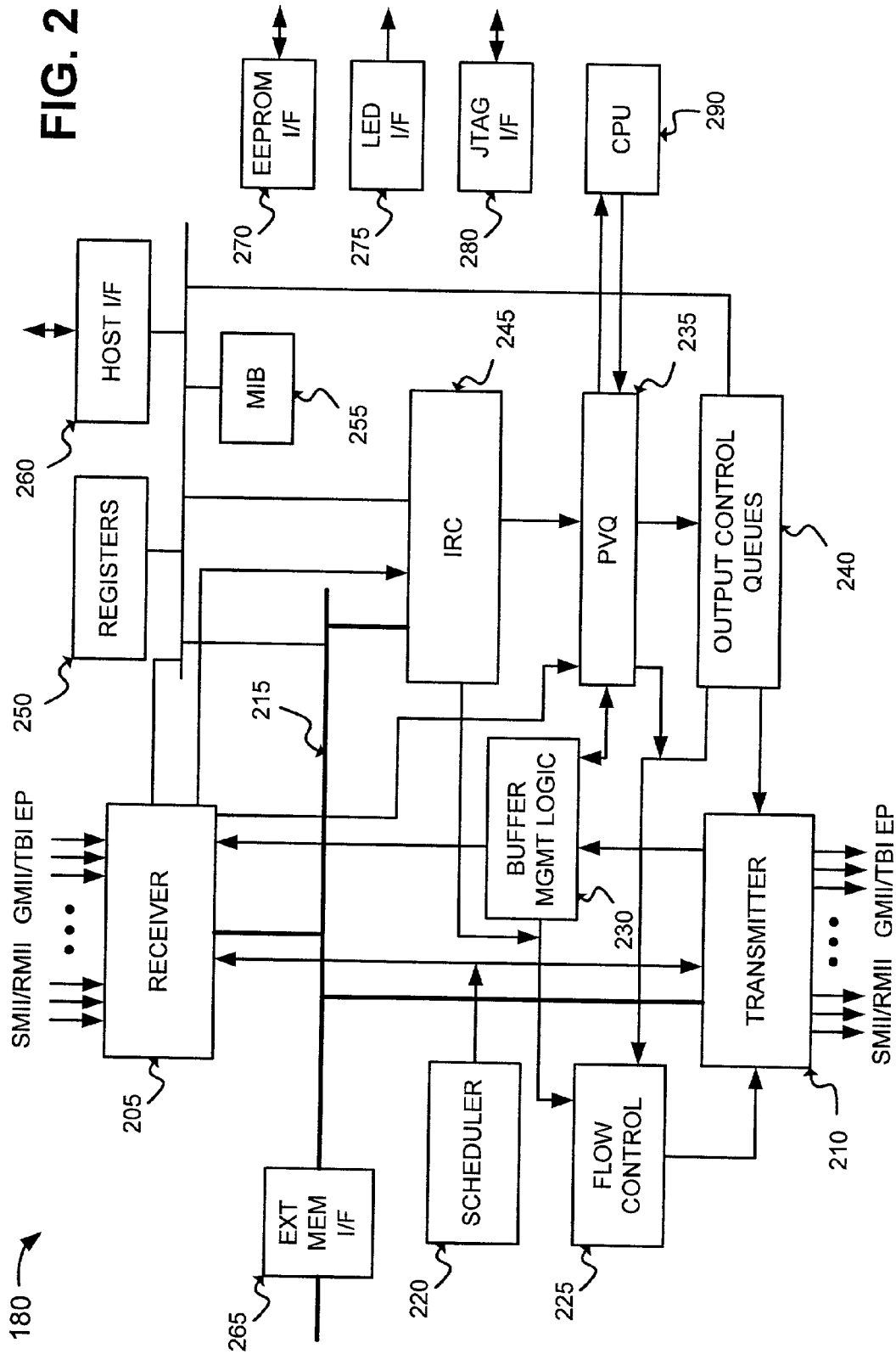
FIG. 2 is a detailed diagram of the multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, a Joint Test Action Group (JTAG) interface 280, and a central processing unit (CPU) 290.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180. The CPU 290 may include logic for performing management functions. As will be described in more detail below, the CPU 290 may program IP and MAC address, perform IP aging operations, etc.

The foregoing description of the switch architecture provides an overview of the switch operations in a packet switched network. A more detailed description of the features of the present invention as embodied, for example, in the multiport switch 180 is provided below.

Exemplary Implementation

The present invention allows a network device, such as the multiport switch 180, to perform layer 3 switching without the use of a layer 3 IRC.

Figure 3:
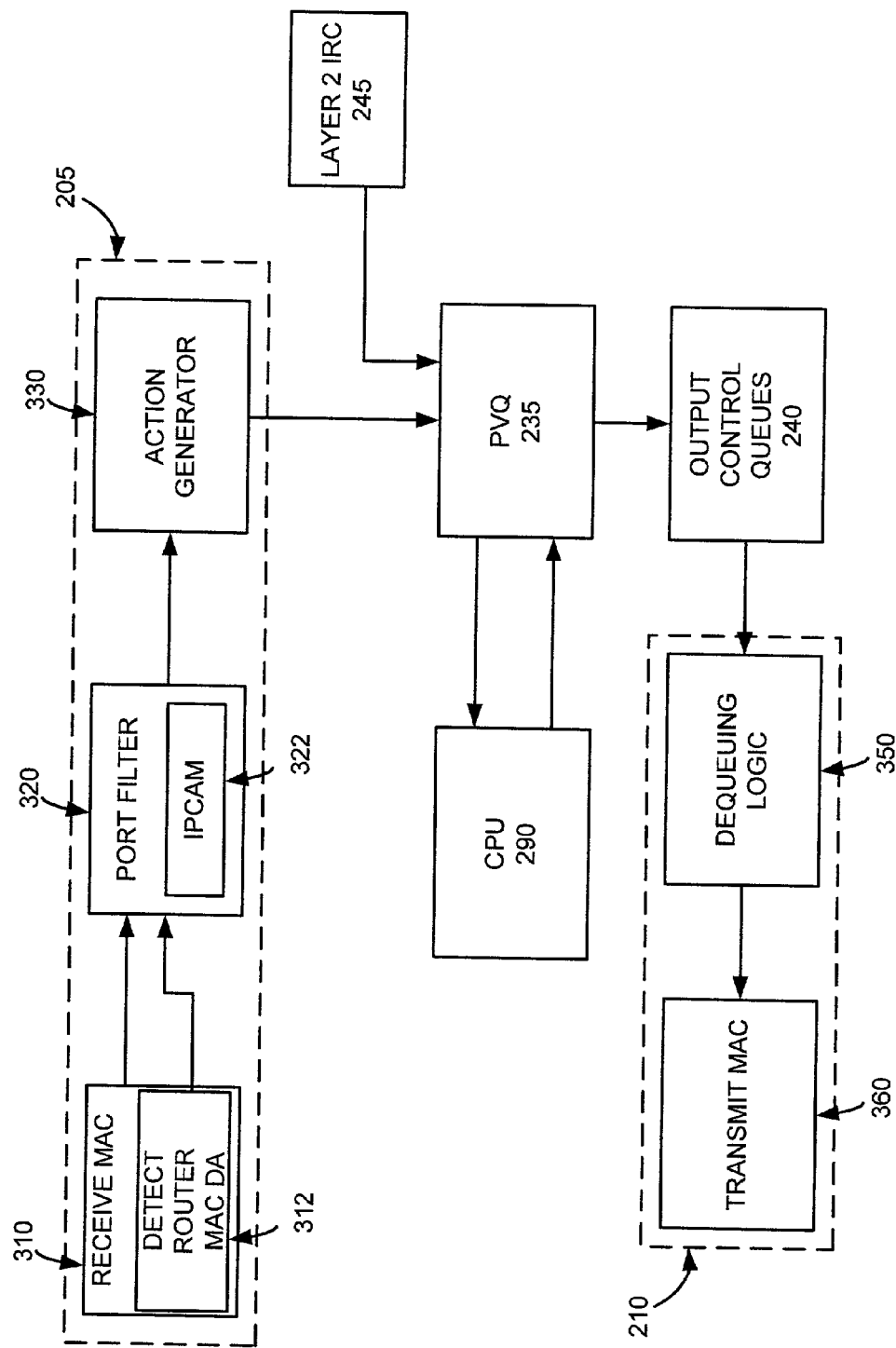
FIG. 3 is a detailed diagram of an exemplary portion of the multiport switch of FIG. 2 according to an implementation consistent with the present invention.

FIG. 3 is a detailed diagram of an exemplary portion of the multiport switch 180 according to an implementation consistent with the present invention. The portion of the multiport switch 180 shown in FIG. 3 includes the receiver

205, the PVQ 235, the output control queues 240, a layer 2 IRC 245, CPU 290, and the transmitter 210. The receiver 205 may include a MAC module 310 corresponding to an input port of the multiport switch 180, a port filter 320, and an action generator 330. One receive MAC module 310 is illustrated for simplicity. It will be appreciated that the receiver 205 may include one MAC module for each input port of the multiport switch 180. Each MAC module may include a receive FIFO buffer and queuing logic (not shown). The receive FIFO buffer temporarily buffers data frames received on the corresponding input port. The queuing logic transfers packet data from the receive FIFO buffer to the external memory 170 (FIG. 1) via the external memory interface 265.

To perform layer 3 switching, the receive MAC module 310 may also include logic 312 for detecting the presence of a router MAC destination address in a received packet and asserting a detection signal to the port filter 320 to inform the port filter 320 of the router MAC destination address. The receive MAC module 310 may, for example, detect the presence of the router MAC destination address by comparing received MAC destination addresses to a table of router MAC destination addresses.

The port filter 320 may include logic for determining policy information associated with received packets. For example, the port filter 320 may apply policy rules to the received packets to identify one or more policies relating to the packets. A policy may specify the type of processing to be given to a received packet, such as whether the packet should receive expedited, assured, or default processing or whether the packet should be dropped or sent to a management device. The policy may also include a port vector that identifies the output port of the multiport switch 180 to which the packet is to be forwarded.

In an implementation consistent with the present invention, the port filter 320 may include an Internet Protocol content addressable memory (IPCAM) 322 that stores source and destination IP addresses. The number of entries (i.e., IP addresses) in the IPCAM 322 may be set based on system requirements. In an implementation consistent with the present invention, the IPCAM 322 may include 128 entries.

Figure 4:
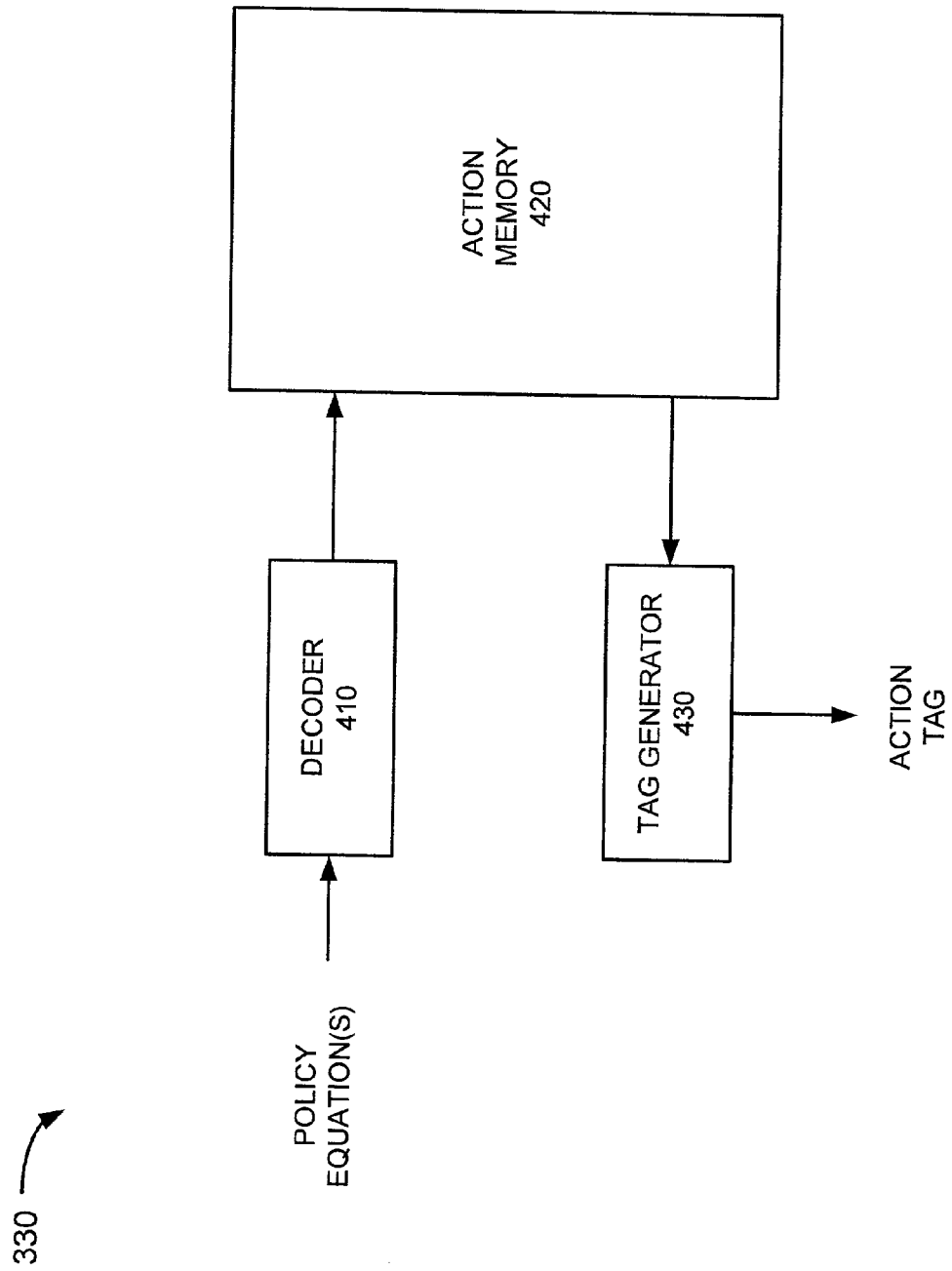
FIG. 4 is an exemplary diagram of the action generator according to an implementation consistent with the present invention.

The action generator 330 may operate upon the result of the port filter 320 to generate an action tag for each of the received packets. FIG. 4 is an exemplary diagram of the action generator 330 according to an implementation consistent with the present invention. The action generator 330 may include a decoder 410, an action memory 420, and a tag generator 430. The decoder 410 may receive identification of one or more policies associated with a received packet from the port filter 320. If the port filter 320 identified more than one policy, the decoder 410 may select one of the identified policies. Based on the selected policy, the decoder 410 may generate an address for storage in the action memory 420.

The action memory 420 may store information regarding the manner in which received packets may be processed by the multiport switch 180. The action memory 420 may also store MAC source and destination addresses corresponding to IP addresses stored in the IPCAM 322. The tag generator 430 may obtain an entry from the action memory 420 and, based on the obtained entry, assemble an action tag for transmission to the PVQ 235. The action tag informs the PVQ 235 of the manner in which the corresponding packet is to be processed within the switch 180. The action tag may, for example, include a frame pointer that identifies the location of the packet data within the external memory 170 to the PVQ 235. Upon reception of a packet, the tag generator 430 may also determine if a time to live (TTL) value in the packet is zero. As will be described in more detail below, a zero TTL value causes the associated packet to be dropped.

Figure 5:
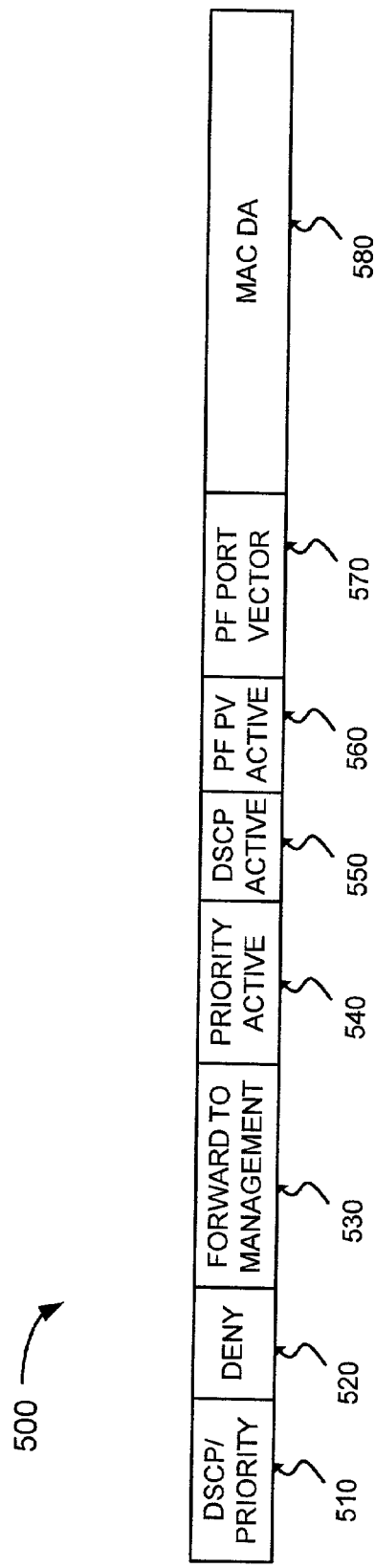
FIG. 5 is a diagram of an exemplary action tag in an implementation consistent with the present invention.

FIG. 5 is a diagram of an exemplary action tag 500 in an implementation consistent with the present invention. The action tag 500 may include a differentiated services code point (DSCP)/priority field 510, a deny field 520, a forward-to-management field 530, a priority active field 540, a DSCP active field 550, a port filter (PF) port vector (PV) active field 560, a PF port vector field 570, and a MAC destination address (DA) field 580. It will be appreciated that the action tag 500 may include more or less fields than are illustrated in FIG. 5.

The DSCP/priority field 510 may include data that identifies a service that is to be provided or a priority that is to be given to the packet. The service provided to a packet may include a differentiated service, such as those described in K. Nichols, "Definition of the Differentiated Services Field (DS Field) in the IPv4 and IPv6 Headers," RFC2474, ftp://ftp.normos.org/ietf/rfc/rfc2474.txt, December 1998, and in S. Blake, "An Architecture for Differentiated Services," ftp://ftp.normos.org/ietf/rfc/rfc2475.txt, December 1998.

The deny field 520 may include data that identifies whether the packet should be dropped. The action generator 330 may, for example, set the deny field 520 when the tag generator 430 detects a zero TTL value. The forward-to-management field 530 may include data that identifies whether the packet should be transmitted to a management device, such as the CPU 290. The priority active field 540 may include data that identifies whether the DSCP/priority field 510 contains valid priority data. The DSCP active field 550 may include data that identifies whether the DSCP/priority field 510 contains valid DSCP data.

The PF PV active field 560 may include data that indicates whether the PF port vector in the PF port vector field 570 and the replacement MAC destination address in the MAC DA field 580 are to be used for forwarding the packet. When this field is set, the PVQ 235 ignores any port vectors generated by the layer 2 IRC 245. The PF port vector field 570 may include the forwarding vector generated by the port filter 320 that identifies the output port(s) to which the packet is to be forwarded. The MAC DA field 580 may include a MAC destination address that is to replace the router MAC destination address received in the packet. The MAC destination address may, for example, be a 48-bit address.

Returning to FIG. 3, the PVQ 235 may determine the appropriate output queue(s) in output control queues 240 that correspond to the output port(s) that is to transmit the packet. The PVQ 235 may make this determination based on the port vector 570 contained in the action tag 500.

The output control queues 240 may include priority queues (not shown) associated with different priority levels. Each of the priority queues may store a forwarding descriptor related to a packet with the corresponding priority level. Each priority queue may also store other packet forwarding information, such as replacement MAC destination addresses, decrement TTL opcode commands, and modify MAC destination address opcode commands. The CPU 290 may include logic for performing management functions, such as programming IP source and destination addresses in the IPCAM 322 of the port filter 320, programming source and destination MAC addresses in the action memory 420 of the action generator 330, and performing IP aging. It will be appreciated that, in an alternative implementation consistent with the present invention, the host 160 may perform the management functions described as being performed by the CPU 290.

The transmitter 210 may include dequeuing logic 350, a transmit FIFO buffer (not shown), and a MAC module 360 corresponding to an output port of the multiport switch 180. One dequeing logic 350 and one transmit MAC module 360 are illustrated for simplicity. It will be appreciated that the transmitter 210 may include one dequeing logic 350 and one transmit MAC module 360 for each output port of the multiport switch 180. The dequeuing logic 350 transfers packet data from the external memory 170 to the transmit FIFO buffer. The transmit MAC module 360 transmits the packets from the output port with which the module 360 is associated.

Exemplary Processing

Figure 6:
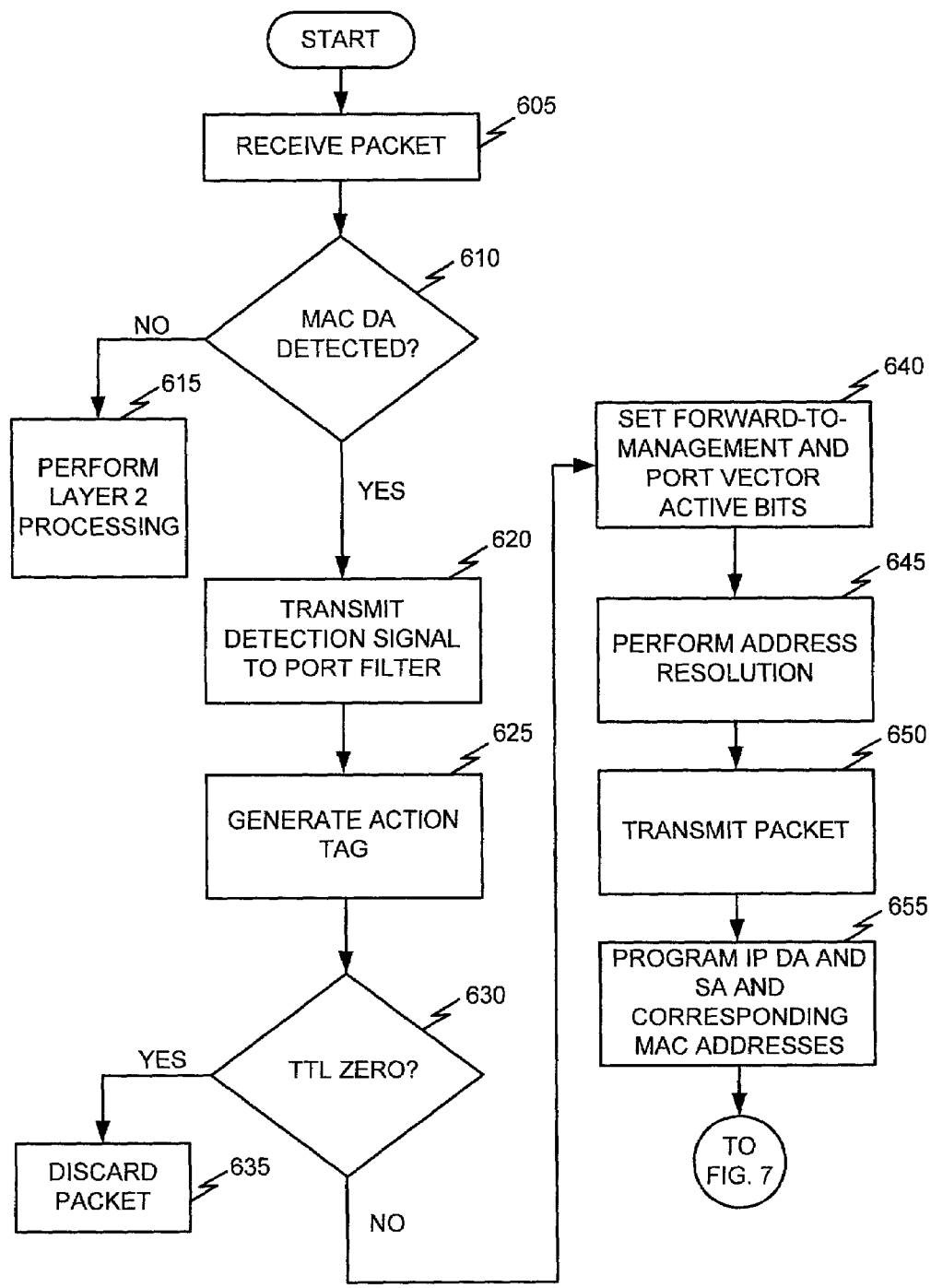
FIGS. 6–8 are flowcharts of exemplary processing for performing layer 3 switching in a network device according to an implementation consistent with the present invention.
Figure 7:
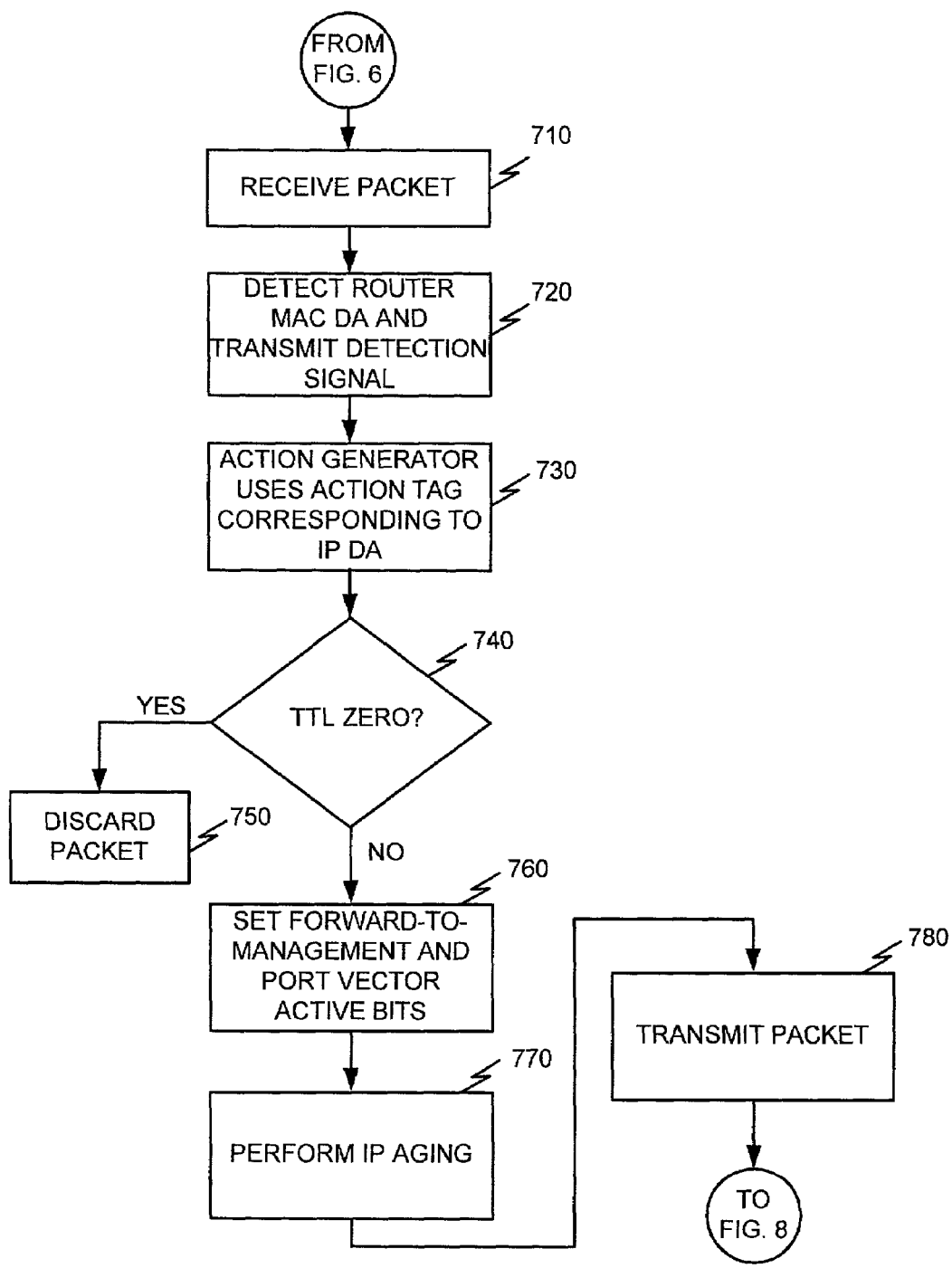
Figure 8:
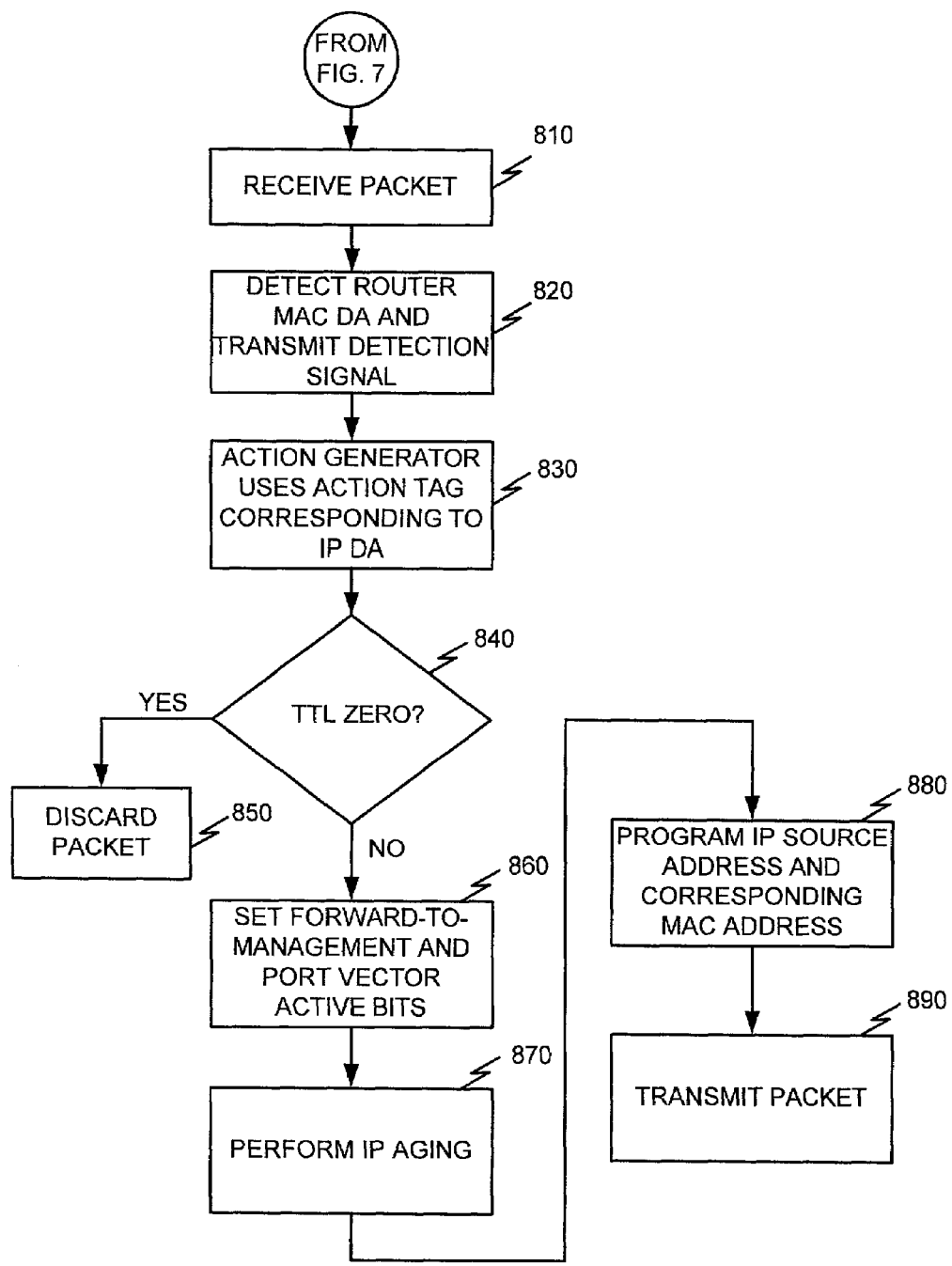

FIGS. 6–8 are flowcharts of exemplary processing for performing layer 3 switching in a network device, such as multiport switch 180, according to an implementation consistent with the present invention. Processing may begin upon start-up of multiport switch 180. Upon start-up, the host 160 may initialize various registers and tables on multiport switch 180. After the various registers and tables are initialized, assume that a source network station 110 in a first subnet transmits a packet and multiport switch 180 receives the packet [act 605]. Assume further that the packet requires layer 3 switching from port 1 of the source network station 110 in the first subnet to port 2 of a destination network station 110 in a second subnet.

Upon receipt of the packet, the receive MAC module 310 may determine whether the packet includes a router MAC destination address [act 610]. If the receive MAC module 310 determines that the packet does not include a router MAC destination address, the multiport switch 180 performs layer 2 processing as, for example, described above with respect to FIG. 2 [act 615]. If, on the other hand, the receive MAC module 310 detects a router MAC destination address, the MAC module 310 may transmit a detection signal to the port filter 320 [act 620].

As described above, the port filter 320 may determine policy information associated with the received packet. For example, in response to the detection signal, the port filter 320 may indicate to the action generator 330 that the forward-to-management bit is to be set. This bit indicates that the packet is to be forwarded to the local CPU 290 for processing. Since the multiport switch 180 has just started up, the IPCAM 322 and action memory 420 may not include the IP destination and source addresses and the corresponding MAC addresses that are included in the packet from port 1.

The action generator 330 may generate an action tag 500 for the received packet [act 625]. The action generator 330 may also determine whether the TTL value associated with the received packet is zero [act 630]. If the TTL value is zero, the action generator 330 sets the deny bit 520 in the action tag 500 to cause the packet to be discarded [act 635]. If the TTL value is not zero, the action generator 330 may set the forward-to-management bit 530 in the action tag 500 so that the packet will be forwarded to the local CPU 290 for processing and the port filter port vector active bit 560 to indicate to the PVQ 235 that the port filter port vector 570 and replacement MAC destination address 580 are to be used [act 640]. The action generator 330 forwards the action tag 500 to the PVQ 235.

The CPU 290 may read the action tag 500 from the PVQ 235 and perform address resolution processing on the action tag 500 to determine the port 2 MAC address based on the port 2 IP address contained in the received packet [act 645]. Here, the CPU 290 may access a table within the multiport switch 180 that maintains a correlation between each MAC address and its corresponding IP address. It will be appreciated that, during this address resolution process, the IRC 245 may learn the router MAC address and the port 2 MAC address in a conventional manner. The CPU 290 may also generate a decrement TTL opcode command to cause the packet's TTL to be decremented prior to transmitting the packet to port 2 of the destination network station 110.

Once the port 2 MAC address has been determined, the CPU 290 may transfer the packet to the output control queues 240 via the PVQ 235. Dequeuing logic 350 and transmit MAC 360 may then transmit the packet to port 2 of the destination network station 110 [act 650]. The CPU 290 may also program the IP source address (SA) and destination address (DA) [act 655]. The CPU 290 may program the IPCAM 322 for the port 1 IP address in one entry and the corresponding entry in the action memory 420 with the corresponding port 1 MAC address. In addition, the CPU 290 may program the IPCAM 322 for the port 2 IP address in one entry and the corresponding entry in the action memory 420 with the corresponding port 2 MAC address.

Assume now that the multiport switch 180 receives another packet that requires layer 3 switching between the local subnets from port 1 to port 2 [act 710] (FIG. 7). Upon receipt of the packet, the receive MAC module 310 detects a router MAC destination address in the packet and transmits a detection signal to the port filter 320 [act 720]. Since the IP source and destination addresses are in the IPCAM 322, the action generator 330 may use the action tag 500 corresponding to the IP destination address [act 730]. The action generator 330 may also determine whether the TTL value associated with the packet is zero [act 740]. If the TTL value is zero, the action generator 330 sets the deny bit in the action tag 500 to cause the packet to be discarded [act 750]. If the TTL value is not zero, the action generator 330 may set the port filter port vector active bit 560 and the forward-to-management bit 530 in the action tag 500 and forward the action tag 500 to the PVQ 235 [act 760]. As described above, the port filter port vector active bit 560 tells the PVQ 235 that the port vector 570 and the replacement MAC destination address 580 in the action tag 500 are to be used by the PVQ 235 for forwarding the packet information to the appropriate one of the output control queues 240 of the multiport switch 180 and for transmitting the packet to its intended destination. It will be appreciated that the PVQ 235 may also receive forwarding information from the IRC 245, due to router MAC destination address matching. The PVQ 235, however, ignores this forwarding information as a result of the port filter port vector active bit 560 in the action tag 500 being set.

By setting the forward-to-management bit 530, the CPU 290 receives the action tag 500. The CPU 290 may then perform an IP address aging operation in a well-known manner [act 770]. The CPU 290 may also generate a decrement TTL opcode command to decrease the value of the TTL in the packet. The PVQ 235 transfers forwarding information, such as the port vector, the replacement MAC destination address, a decrement TTL opcode command, and a modify MAC destination address opcode command, to the appropriate queue in output control queues 240. The dequeuing logic 350 reads the forwarding information and the packet data. The transmit MAC 360 may then perform any necessary modifications and transmit the packet to port 2 of the destination network station 110 [act 780].

Assume that the multiport switch 180 receives another packet that requires layer 3 switching [act 810] (FIG. 8). This time assume that the packet requires layer 3 switching between the local subnets from port 3 of a different source network station 110 to port 2 of the destination network station 110. Upon receipt of the packet, the receive MAC module 310 detects a router MAC destination address in the packet and transmits a detection signal to the port filter 320 [act 820]. Since the IP destination address is in the IPCAM 322, the action generator 330 may use the action tag 500 corresponding to the IP destination address [act 830].

The action generator 330 may determine whether the TTL value associated with the packet is zero [act 840]. If the TTL value is zero, the action generator 330 sets the deny bit to cause the packet to be discarded [act 850]. If the TTL value is not zero, the action generator 330 may set the port filter port vector active bit 560 and the forward-to-management bit 530 in the action tag 500 and forward the action tag 500 to the PVQ 235 [act 860]. As described above, the port filter port vector active bit 560 tells the PVQ 235 that the port vector 570 and the replacement MAC destination address 580 in the action tag 500 are to be used by the PVQ 235. It will be appreciated that the PVQ 235 may also receive forwarding information from the IRC 245, due to router MAC destination address matching. The PVQ 235, however, ignores this forwarding information as a result of the port filter port vector active bit 560 in the action tag 500 being set.

By setting the forward-to-management bit 530, the CPU 290 receives the action tag 500. The CPU 290 may then perform an IP address aging operation in a well-known manner [act 870]. The CPU 290 may also perform other management functions, such as programming the IP source address [act 880]. The CPU 290 may program the IPCAM 322 for the port 3 IP address in one entry and the corresponding entry in the action memory 420 with the corresponding port 3 MAC address. The CPU 290 may generate a decrement TTL opcode command to decrease the value of the TTL in the packet prior to the packet being transmitted.

The PVQ 235 transfers forwarding information, such as the port vector, the replacement MAC destination address, a decrement TTL opcode command, and a modify MAC destination address opcode command, to the appropriate queue in output control queues 240. The dequeuing logic 350 reads the forwarding information and the corresponding packet data. The transmit MAC 360 may then perform any necessary modifications and transmit the packet to port 2 of the destination network station 110 [act 890].

Described has been a system and method for performing layer 3 switching in a network device. An advantage of the present invention includes the ability to perform layer 3 switching without the use of a layer 3 IRC.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while series of acts have been described with respect to FIGS. 6–8, the order of the acts may be varied in other implementations consistent with the present invention. No element or act used in the description of the present application should be construed as critical unless explicitly described as such.

The scope of the invention is defined by the claims and their equivalents.

What is claimed is:

1. A method for transferring data in a network device, comprising:
  receiving a packet including a router media access control (MAC) destination address and an Internet Protocol (IP) destination address;
  determining, when the packet includes a router MAC destination address, a replacement MAC destination address based on the IP destination address, the determining including:
    determining whether the IP destination address has been previously stored,
    selecting a MAC destination address corresponding to the IP destination address as the replacement MAC destination address when the IP destination address has been previously stored,
    routing the packet to a local processor when the IP destination address has not been previously stored, and
    performing an address resolution operation to determine the replacement MAC destination address; and
  routing the packet using the replacement MAC destination address.

2. The method of claim 1 further comprising:
  programming the IP destination address and the replacement MAC destination address when the IP destination address has not been previously stored.

3. The method of claim 1 further comprising:
  determining whether a time to live (TTL) value in the packet is zero; and
  discarding the packet when the TTL value is zero.

4. The method of claim 3 further comprising:
  routing the packet to a local processor when the TTL value is not zero.

5. The method of claim 4 further comprising:
  decrementing the TTL value in the packet prior to routing the packet.

6. A network device comprising:
  at least one receive module configured to receive a packet and detect whether the packet includes a router media access control (MAC) destination address;
  a port filter configured to store Internet Protocol (IP) source and destination addresses, determine whether an IP destination address associated with the packet has been stored, and identify policy handling information for the packet;
  an action generator configured to generate, based on the policy handling information, forwarding information for the packet, the forwarding information including at least a port vector, and, when the IP destination address associated with the packet has been stored, a replacement MAC destination address;
  processing logic configured to determine a replacement MAC destination address when the IP destination address associated with the packet has not been stored; and
  at least one transmit module configured to transmit the packet based on the replacement MAC destination address.

7. The network device of claim 6 wherein the port filter includes an IP content addressable memory configured to store the IP source and destination addresses.

8. The network device of claim 7 wherein the processing logic is further configured to:

store, when the IP destination address associated with the packet has not been stored, the IP destination address and an IP source address associated with the packet in the IP content addressable memory.

9. The network device of claim 8 wherein the processing logic is further configured to:
store MAC destination and source addresses, corresponding to the IP destination address and the IP source address associated with the packet, in a memory in the action generator.

10. The network device of claim 6 wherein the action generator includes:
a memory configured to store MAC addresses corresponding to the IP source and destination addresses stored in the port filter.

11. The network device of claim 10 wherein, when generating the forwarding information, the action generator is further configured to:
select, when the IP destination address associated with the packet has been stored in the port filter, a corresponding MAC address from the memory as the replacement MAC destination address.

12. The network device of claim 6 wherein the action generator is further configured to:
determine whether a time to live (TTL) value in the packet is zero, and
set a bit in the forwarding information to indicate that the packet is to be dropped.

13. The network device of claim 12 wherein the processing logic is further configured to:
decrement the TTL value associated with the packet prior to the packet being transmitted.

14. The network device of claim 6 wherein, when determining the replacement MAC destination address, the processing logic is further configured to:
determine the MAC destination address based on the IP destination address associated with the packet.

15. In a network device, a system for transferring data between subnets, comprising:
a plurality of receiver modules configured to receive packets, detect, for each packet, whether the packet includes a router media access control (MAC) destination address, and transmit a detection signal when a packet includes a router MAC destination address;
a port filter configured to receive the detection signal, determine whether an Internet Protocol (IP) destination address associated the packet has been stored in a memory within the port filter, and transmit packet handling information based on the determining;
an action generator configured to receive the packet handling information and generate forwarding information for the packet, the forwarding information including a replacement MAC destination address when the IP destination address associated with the packet has been stored;
processing logic configured to determine a replacement MAC destination address for the packet when the IP destination address associated with the packet has not been stored; and
a plurality of transmit modules configured to receive the packet and transmit the packet based on the replacement MAC destination address.

16. The system of claim 15 wherein the processing logic is further configured to:
store the IP destination address associated with the packet in the memory when the IP destination address associated with the packet has not been stored.

17. The system of claim 16 wherein the action generator includes:
a memory configured to store a MAC address corresponding to each IP address stored in the port filter, and
wherein the processing logic is further configured to:
store the replacement MAC destination address in the memory of the action generator when the port filter determines that the IP destination address associated with the packet has not been stored.

18. The system of claim 15 wherein the processing logic is further configured to:
decrement a time to live (TTL) value associated with the packet prior to the packet being transmitted.

* * * * *